(12) United States Patent
Takahashi et al.

(10) Patent No.: US 10,787,136 B2
(45) Date of Patent: Sep. 29, 2020

(54) ELECTRIC POWER SYSTEM FOR CONTROLLING PRE-CHARGE OF VEHICLE

(71) Applicant: Honda Motor Co., Ltd., Tokyo (JP)

(72) Inventors: Masaya Takahashi, Saitama (JP); Naotaka Tsuji, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 39 days.

(21) Appl. No.: 16/101,529

(22) Filed: Aug. 13, 2018

(65) Prior Publication Data

US 2019/0061653 A1  Feb. 28, 2019

(30) Foreign Application Priority Data

Aug. 31, 2017 (JP) ................. 2017-166755

(51) Int. Cl.
*H02J 7/34* (2006.01)
*B60L 3/00* (2019.01)
(Continued)

(52) U.S. Cl.
CPC .............. *B60R 16/03* (2013.01); *B60L 3/003* (2013.01); *B60L 3/0007* (2013.01); *B60L 53/20* (2019.02);
(Continued)

(58) Field of Classification Search
CPC .......... B60L 3/0007; B60L 3/003; B60L 3/04; B60L 58/20; B60L 53/20; H02J 7/345;
(Continued)

(56) References Cited

U.S. PATENT DOCUMENTS 5,352,969 A * 10/1994 Gilmore ................ H02J 7/0081
320/160
5,449,997 A * 9/1995 Gilmore ................ H02J 7/0081
320/148

(Continued)

FOREIGN PATENT DOCUMENTS

JP  2006298240  11/2006
JP  2007244034  9/2007

(Continued)

OTHER PUBLICATIONS

"Office Action of Japan Counterpart Application," dated Mar. 22, 2019, with English translation thereof, p. 1-p. 7.

*Primary Examiner* — John T Trischler
(74) *Attorney, Agent, or Firm* — JCIPRNET

(57) ABSTRACT

An electric power system of a vehicle includes: a high-voltage circuit, which includes a high-voltage battery connected to a main circuit; a system ECU, which controls the main circuit; a first system control power line, which connects a low-voltage battery to the system ECU; a second system control power line, which connects the high-voltage circuit to the first system control power line; a voltage-reducing device, which reduces a voltage of the electric power from the high-voltage circuit; a second switch, which is arranged on the second system control power line; and a backup power supply ECU, which turns the second switch off when a pre-charge of smoothing condensers arranged on the main circuit is performed by supplying the electric power of the high-voltage battery.

3 Claims, 4 Drawing Sheets

(51) Int. Cl.
  *B60R 16/03* (2006.01)
  *H02J 7/14* (2006.01)
  *B60L 53/20* (2019.01)
  *B60L 58/20* (2019.01)

(52) U.S. Cl.
  CPC ............ *B60L 58/20* (2019.02); *H02J 7/1423*
    (2013.01); *H02J 7/342* (2020.01); *H02J 7/345*
    (2013.01)

(58) Field of Classification Search
  CPC ........ H02J 7/0054; H02J 7/1423; H02J 9/061;
    B60R 16/03
  USPC ........................................................ 320/104
  See application file for complete search history.

(56) References Cited

U.S. PATENT DOCUMENTS

| | | | | |
|---|---|---|---|---|
| 5,717,310 A * | 2/1998 | Sakai | ................ | G01R 31/3648 307/10.1 |
| 5,796,175 A * | 8/1998 | Itoh | ................ | B60L 3/0023 307/10.1 |
| 5,994,789 A * | 11/1999 | Ochiai | ................ | H02J 7/345 307/10.1 |
| 6,002,221 A * | 12/1999 | Ochiai | ................ | B60L 3/0023 318/139 |
| 6,329,772 B1 * | 12/2001 | Ochiai | ................ | B60K 6/48 318/139 |
| 6,591,924 B2 * | 7/2003 | Shimizu | ................ | B60L 3/0015 180/65.1 |
| 6,727,676 B2 * | 4/2004 | Ochiai | ................ | B60K 6/485 320/104 |
| 6,794,847 B2 * | 9/2004 | Hosoda | ................ | B60K 6/28 320/104 |
| 6,828,742 B2 * | 12/2004 | Suzuki | ................ | B60K 6/485 318/139 |
| 6,904,342 B2 * | 6/2005 | Hanada | ................ | F02N 11/0866 701/22 |
| 6,923,279 B2 * | 8/2005 | Shimane | ................ | B60K 6/28 180/65.1 |
| 6,949,897 B2 * | 9/2005 | Wakashiro | ................ | B60K 6/485 318/139 |
| 7,079,379 B2 * | 7/2006 | Yamaguchi | ................ | B60L 15/007 180/68.5 |
| 7,095,191 B2 * | 8/2006 | Sakurai | ................ | B60W 10/26 318/139 |
| 7,420,295 B2 * | 9/2008 | Omae | ................ | H01M 6/36 307/66 |
| 7,439,631 B2 * | 10/2008 | Endou | ................ | H02J 7/345 307/9.1 |
| 7,609,033 B2 * | 10/2009 | Sasaki | ................ | B60H 1/00278 320/150 |
| 7,649,335 B2 * | 1/2010 | Ishikawa | ................ | B60L 3/0007 320/104 |
| 7,964,985 B2 * | 6/2011 | Ozaki | ................ | B60L 3/0046 307/10.1 |
| 8,054,031 B2 * | 11/2011 | Uechi | ................ | H02P 29/68 318/800 |
| 8,084,988 B2 * | 12/2011 | Fujino | ................ | H02J 7/345 320/104 |
| 8,174,241 B2 * | 5/2012 | Kojima | ................ | B60L 58/10 320/134 |
| 8,274,173 B2 * | 9/2012 | King | ................ | B60L 1/003 307/9.1 |
| 8,415,825 B2 * | 4/2013 | Hirose | ................ | B60K 6/445 307/9.1 |
| 8,423,210 B2 * | 4/2013 | Kato | ................ | B60K 6/445 701/22 |
| 8,508,067 B2 * | 8/2013 | Song | ................ | B60W 20/50 307/9.1 |
| 8,575,940 B2 * | 11/2013 | Yugou | ................ | B60L 3/04 324/427 |
| 8,598,734 B2 * | 12/2013 | Kusumi | ................ | H02M 3/1584 307/10.1 |
| 8,612,073 B2 * | 12/2013 | Fuji | ................ | B60L 3/00 701/22 |
| 8,618,771 B2 * | 12/2013 | Ichikawa | ................ | B60L 15/007 320/109 |
| 8,694,185 B2 * | 4/2014 | Sakamoto | ................ | B60L 58/12 701/22 |
| 8,723,356 B2 * | 5/2014 | Fukuyama | ................ | B60L 3/0007 307/9.1 |
| 8,773,065 B2 * | 7/2014 | Ang | ................ | B60L 50/51 320/104 |
| 8,803,486 B2 * | 8/2014 | Norimatsu | ................ | H02M 1/36 320/166 |
| 8,810,061 B2 * | 8/2014 | Sugiyama | ................ | B60L 1/003 307/9.1 |
| 8,810,206 B2 * | 8/2014 | Ang | ................ | B60L 3/0069 320/138 |
| 8,848,408 B2 * | 9/2014 | Shindo | ................ | B60L 3/0007 363/56.02 |
| 8,855,843 B2 * | 10/2014 | Kawasaki | ................ | B60L 11/1816 701/22 |
| 8,878,476 B2 * | 11/2014 | Hirose | ................ | B60L 3/00 180/271 |
| 8,901,882 B2 * | 12/2014 | Song | ................ | B60L 53/00 320/109 |
| 8,917,039 B2 * | 12/2014 | Yugo | ................ | B60L 58/18 318/139 |
| 8,937,400 B2 * | 1/2015 | Obayashi | ................ | B60L 1/003 307/9.1 |
| 8,937,451 B2 * | 1/2015 | Muraho | ................ | H02P 27/06 318/801 |
| 8,970,061 B2 * | 3/2015 | Nakagawa | ................ | B60L 3/0046 307/10.1 |
| 9,000,606 B2 * | 4/2015 | Obayashi | ................ | B60L 1/003 307/9.1 |
| 9,041,361 B2 * | 5/2015 | Viancino | ................ | H03K 17/08126 320/166 |
| 9,073,541 B2 * | 7/2015 | Sugiyama | ................ | B60W 20/00 |
| 9,114,698 B2 * | 8/2015 | Amano | ................ | B60L 3/0007 |
| 9,136,783 B2 * | 9/2015 | Mitsutani | ................ | B60L 15/00 |
| 9,145,058 B2 * | 9/2015 | Suzuki | ................ | B60K 1/00 |
| 9,211,803 B2 * | 12/2015 | Yonehana | ................ | B60L 58/10 |
| 9,252,594 B2 * | 2/2016 | Yasuda | ................ | H02J 1/00 |
| 9,300,148 B2 * | 3/2016 | Oh | ................ | H02J 7/0022 |
| 9,321,350 B2 * | 4/2016 | Yokoyama | ................ | H01M 10/44 |
| 9,331,493 B2 * | 5/2016 | Tsuji | ................ | H02J 4/00 |
| 9,463,695 B2 * | 10/2016 | Matsuda | ................ | B62K 11/04 |
| 9,487,098 B2 * | 11/2016 | Yamada | ................ | H02M 3/3376 |
| 9,539,910 B2 * | 1/2017 | Sugiyama | ................ | B60L 8/003 |
| 9,637,009 B2 * | 5/2017 | Sugiura | ................ | B60L 58/18 |
| 9,649,943 B2 * | 5/2017 | Song | ................ | B60L 11/1809 |
| 9,774,281 B2 * | 9/2017 | Sakai | ................ | B60L 15/12 |
| 9,873,339 B2 * | 1/2018 | Mitsutani | ................ | B60L 58/20 |
| 9,893,617 B2 * | 2/2018 | Ide | ................ | H02M 3/158 |
| 9,925,878 B2 * | 3/2018 | Hashim | ................ | B60L 50/50 |
| 9,948,093 B2 * | 4/2018 | Peuser | ................ | B60L 3/0046 |
| 9,950,627 B2 * | 4/2018 | Yaegaki | ................ | H02M 3/155 |
| 9,963,166 B2 * | 5/2018 | Xu | ................ | B62D 5/046 |
| 9,991,789 B2 * | 6/2018 | Oi | ................ | B60L 3/0007 |
| 9,997,938 B2 * | 6/2018 | Tzivanopoulos | ...... | H02H 9/001 |
| 9,998,056 B2 * | 6/2018 | Nozawa | ................ | B60L 3/0007 |
| 10,005,370 B2 * | 6/2018 | Murasato | ................ | B60L 11/1844 |
| 10,008,969 B2 * | 6/2018 | Oba | ................ | H02P 27/06 |
| 10,023,052 B2 * | 7/2018 | Oba | ................ | H02M 7/5387 |
| 10,029,572 B2 * | 7/2018 | Sakatani | ................ | B60L 50/50 |
| 10,040,368 B2 * | 8/2018 | Oguma | ................ | B60L 7/14 |
| 10,054,642 B2 * | 8/2018 | Mizobe | ................ | H02J 7/047 |
| 10,086,706 B2 * | 10/2018 | Nomura | ................ | B60L 3/04 |
| 10,090,752 B2 * | 10/2018 | Takahashi | ........ | H02M 7/53871 |
| 10,181,738 B2 * | 1/2019 | Minesawa | ................ | H02J 7/0029 |
| 10,183,555 B2 * | 1/2019 | Sakai | ................ | B60L 1/003 |
| 10,189,358 B2 * | 1/2019 | Mitsutani | ................ | B60L 58/10 |
| 10,202,042 B2 * | 2/2019 | Yamane | ................ | B60L 50/40 |
| 10,300,906 B2 * | 5/2019 | Oguma | ................ | B60W 20/13 |
| 10,312,826 B2 * | 6/2019 | Takahashi | ................ | H02M 7/487 |
| 10,348,107 B2 * | 7/2019 | Sung | ................ | H02J 7/0068 |

(56) References Cited

U.S. PATENT DOCUMENTS

| | | | | |
|---|---|---|---|---|
| 10,381,846 B2* | 8/2019 | Mito | | H02M 7/537 |
| 10,414,276 B2* | 9/2019 | Song | | B60L 53/14 |
| 10,439,405 B2* | 10/2019 | Kawamura | | B60L 50/51 |
| 10,444,290 B2* | 10/2019 | Kawamura | | B60L 58/12 |
| 10,500,970 B2* | 12/2019 | Kawamura | | B60L 58/13 |
| 10,536,087 B1* | 1/2020 | He | | H02M 1/08 |
| 2001/0050189 A1* | 12/2001 | Shimizu | | B60L 3/0015 |
| | | | | 180/65.29 |
| 2002/0101217 A1* | 8/2002 | Hosoda | | B60K 6/28 |
| | | | | 320/124 |
| 2002/0109407 A1* | 8/2002 | Morimoto | | B60K 6/28 |
| | | | | 307/10.1 |
| 2003/0029654 A1* | 2/2003 | Shimane | | B60K 6/28 |
| | | | | 180/65.29 |
| 2003/0117019 A1* | 6/2003 | Furukawa | | B60L 1/02 |
| | | | | 307/10.6 |
| 2003/0132730 A1* | 7/2003 | Ochiai | | B60K 6/485 |
| | | | | 320/104 |
| 2003/0139859 A1* | 7/2003 | Hanada | | F02N 11/0866 |
| | | | | 701/22 |
| 2004/0257039 A1* | 12/2004 | Clift | | H02J 7/0054 |
| | | | | 320/128 |
| 2005/0253458 A1* | 11/2005 | Omae | | H01M 6/36 |
| | | | | 307/10.1 |
| 2006/0220601 A1* | 10/2006 | Horii | | B60L 1/02 |
| | | | | 318/139 |
| 2007/0222413 A1* | 9/2007 | Kinoshita | | B60W 10/26 |
| | | | | 320/104 |
| 2007/0273209 A1* | 11/2007 | Endou | | H02J 7/345 |
| | | | | 307/45 |
| 2008/0197810 A1* | 8/2008 | Ishikawa | | B60L 3/0007 |
| | | | | 320/135 |
| 2009/0108674 A1* | 4/2009 | Ozaki | | B60L 3/0046 |
| | | | | 307/10.6 |
| 2009/0167234 A1* | 7/2009 | Uechi | | H02P 29/68 |
| | | | | 318/800 |
| 2009/0230917 A1* | 9/2009 | Kojima | | B60L 58/10 |
| | | | | 320/101 |
| 2009/0289589 A1* | 11/2009 | Fujino | | H02J 7/345 |
| | | | | 318/441 |
| 2010/0019723 A1* | 1/2010 | Ichikawa | | B60L 15/007 |
| | | | | 320/109 |
| 2010/0214055 A1* | 8/2010 | Fuji | | B60L 3/00 |
| | | | | 340/3.1 |
| 2011/0049977 A1* | 3/2011 | Onnerud | | B60L 3/0046 |
| | | | | 307/9.1 |
| 2011/0128662 A1* | 6/2011 | Kato | | B60L 3/0069 |
| | | | | 361/166 |
| 2011/0210746 A1* | 9/2011 | Yugou | | B60L 3/04 |
| | | | | 324/427 |
| 2011/0260531 A1* | 10/2011 | Obayashi | | B60L 1/003 |
| | | | | 307/10.1 |
| 2011/0288705 A1* | 11/2011 | Kawasaki | | B60L 11/1816 |
| | | | | 701/22 |
| 2011/0316489 A1* | 12/2011 | Norimatsu | | H02M 7/5375 |
| | | | | 320/166 |
| 2012/0004798 A1* | 1/2012 | Sakamoto | | B60L 58/12 |
| | | | | 701/22 |
| 2012/0007551 A1* | 1/2012 | Song | | B60L 53/00 |
| | | | | 320/109 |
| 2012/0025768 A1* | 2/2012 | Nakano | | H02J 7/345 |
| | | | | 320/116 |
| 2012/0032505 A1* | 2/2012 | Kusumi | | B60L 58/22 |
| | | | | 307/10.1 |
| 2012/0039100 A1* | 2/2012 | Hirose | | B60K 6/445 |
| | | | | 363/50 |
| 2012/0055727 A1* | 3/2012 | Omiya | | B60L 50/16 |
| | | | | 180/279 |
| 2012/0112684 A1* | 5/2012 | Xu | | B60L 3/0046 |
| | | | | 320/101 |
| 2012/0169143 A1* | 7/2012 | Nakagawa | | B60L 3/0046 |
| | | | | 307/328 |
| 2012/0187775 A1* | 7/2012 | Nordstrom | | B60L 3/0069 |
| | | | | 307/112 |
| 2012/0212160 A1* | 8/2012 | Shindo | | B60L 3/0007 |
| | | | | 318/139 |
| 2013/0033914 A1* | 2/2013 | Yahata | | H02M 7/48 |
| | | | | 363/132 |
| 2013/0106320 A1* | 5/2013 | Yugo | | B60L 58/18 |
| | | | | 318/139 |
| 2013/0106365 A1* | 5/2013 | Ang | | B60L 3/0069 |
| | | | | 320/138 |
| 2013/0116875 A1* | 5/2013 | Oh | | B60L 15/2045 |
| | | | | 701/22 |
| 2013/0169048 A1* | 7/2013 | Yasuda | | H02J 1/00 |
| | | | | 307/31 |
| 2013/0181520 A1* | 7/2013 | Tsuji | | H02J 4/00 |
| | | | | 307/31 |
| 2013/0221921 A1* | 8/2013 | Ang | | B60L 15/007 |
| | | | | 320/109 |
| 2014/0084818 A1* | 3/2014 | Sugiyama | | H02J 7/1423 |
| | | | | 318/139 |
| 2014/0139194 A1* | 5/2014 | Dinand Da Silva | | H02J 7/00 |
| | | | | 320/166 |
| 2014/0176085 A1* | 6/2014 | Maruno | | B60L 58/16 |
| | | | | 320/162 |
| 2014/0214251 A1* | 7/2014 | Sugiyama | | B60W 20/00 |
| | | | | 701/22 |
| 2014/0286060 A1* | 9/2014 | Sugiura | | B60L 58/18 |
| | | | | 363/56.01 |
| 2014/0309827 A1* | 10/2014 | Kanzaki | | B60L 3/04 |
| | | | | 701/22 |
| 2014/0339009 A1* | 11/2014 | Suzuki | | B60K 1/00 |
| | | | | 180/232 |
| 2015/0008734 A1* | 1/2015 | Ishida | | B60R 16/033 |
| | | | | 307/10.1 |
| 2015/0097426 A1* | 4/2015 | Yamane | | B60L 50/40 |
| | | | | 307/10.1 |
| 2015/0097501 A1* | 4/2015 | Yamane | | B60L 1/00 |
| | | | | 318/400.3 |
| 2015/0097525 A1* | 4/2015 | DeDona | | B60L 50/66 |
| | | | | 320/109 |
| 2015/0097526 A1* | 4/2015 | DeDona | | B60L 53/18 |
| | | | | 320/109 |
| 2015/0097527 A1* | 4/2015 | DeDona | | B60L 11/1818 |
| | | | | 320/109 |
| 2015/0183325 A1* | 7/2015 | Mitsutani | | B60L 58/20 |
| | | | | 307/10.1 |
| 2015/0197153 A1* | 7/2015 | Luedtke | | B60L 3/0023 |
| | | | | 324/503 |
| 2015/0197156 A1* | 7/2015 | Song | | B60L 53/00 |
| | | | | 320/109 |
| 2015/0231976 A1* | 8/2015 | Byun | | B60L 3/0084 |
| | | | | 320/109 |
| 2016/0006295 A1* | 1/2016 | Yang | | H02J 7/34 |
| | | | | 307/66 |
| 2016/0059712 A1* | 3/2016 | Jang | | B60L 3/0084 |
| | | | | 307/10.1 |
| 2016/0144725 A1* | 5/2016 | Nozawa | | B60L 58/12 |
| | | | | 307/10.1 |
| 2016/0156258 A1* | 6/2016 | Yokoyama | | B60L 58/20 |
| | | | | 307/82 |
| 2016/0272076 A1* | 9/2016 | Fan | | B60L 11/1816 |
| 2016/0375792 A1* | 12/2016 | Kazuno | | B60L 58/40 |
| | | | | 320/101 |
| 2017/0093319 A1* | 3/2017 | Oba | | H02P 27/06 |
| 2017/0106758 A1* | 4/2017 | Sakatani | | B60R 16/033 |
| 2017/0129350 A1* | 5/2017 | Mitsutani | | B60L 58/10 |
| 2017/0166065 A1* | 6/2017 | Hong | | B60L 3/04 |
| 2017/0166075 A1* | 6/2017 | Hong | | B60L 58/12 |
| 2017/0207638 A1* | 7/2017 | Kawamura | | H02J 7/0014 |
| 2017/0246958 A1* | 8/2017 | Song | | B60L 53/00 |
| 2017/0285109 A1* | 10/2017 | Kawamura | | H02J 7/0008 |
| 2017/0294791 A1* | 10/2017 | Mito | | H02J 7/0029 |
| 2017/0373628 A1* | 12/2017 | Nozawa | | H02P 27/06 |
| 2018/0105043 A1* | 4/2018 | Migita | | G01R 31/42 |
| 2018/0178775 A1* | 6/2018 | Ono | | B60L 3/0007 |
| 2018/0236874 A1* | 8/2018 | Tsukada | | B60L 3/04 |

(56) References Cited

U.S. PATENT DOCUMENTS

| | | | | |
|---|---|---|---|---|
| 2018/0264958 | A1* | 9/2018 | Okada | B60L 53/14 |
| 2018/0361861 | A1* | 12/2018 | Bando | B60L 58/13 |
| 2019/0023130 | A1* | 1/2019 | Garcha | B60L 1/02 |
| 2019/0061654 | A1* | 2/2019 | Tsuji | H02J 7/007 |
| 2019/0135119 | A1* | 5/2019 | Nozawa | H02M 3/158 |
| 2019/0168613 | A1* | 6/2019 | Takegawa | B60L 3/00 |
| 2019/0173311 | A1* | 6/2019 | Kudo | B60R 16/033 |
| 2019/0173390 | A1* | 6/2019 | Takegawa | H02P 27/06 |
| 2019/0202300 | A1* | 7/2019 | Pastor | H02M 1/4208 |
| 2019/0229377 | A1* | 7/2019 | Kim | B60L 50/50 |
| 2019/0356139 | A1* | 11/2019 | Ichikawa | B60L 58/19 |

FOREIGN PATENT DOCUMENTS

| | | | | |
|---|---|---|---|---|
| JP | 2013165623 | | 8/2013 | |
| WO | WO-2015142062 | A1 * | 9/2015 | G01R 3/142 |

* cited by examiner

ELECTRIC POWER SYSTEM FOR CONTROLLING PRE-CHARGE OF VEHICLE

CROSS-REFERENCE TO RELATED APPLICATION

This application claims the benefit of Japanese Application Serial No. 2017-166755, filed on Aug. 31, 2017. The entirety of the above-mentioned patent application is hereby incorporated by reference herein and made a part of this specification.

BACKGROUND

Technical Field

The disclosure relates to an electric power system of a vehicle.

Related Art

An electric vehicle such as a hybrid car or an electric car has an electric power system mounted on, and runs by using electric power supplied from the electric power system to drive a motor. The electric power system is divided into a high-voltage system which has a high-voltage battery and mainly supplies the electric power to the motor, and a low-voltage system which has a low-voltage battery with an output voltage lower than the high-voltage battery and mainly supplies the electric power to a control device or auxiliary machines of the vehicle.

In Japanese Laid-open No. 2006-298240 (Patent Literature 1), a load which needs constant electric power supply (for example, an electric brake system which controls an electric foot brake or an electric parking brake) is defined as a backup object load, and an electric power system capable of supplying the electric power from both a low-voltage system and a high-voltage system to the backup object load is disclosed.

In the electric power system of Patent Literature 1, a power supply path which connects the high-voltage system to the backup object load, and a power supply path which connects the low-voltage system to the backup object load are connected via a diode. In this electric power system, usually the electric power is supplied from the low-voltage system to the backup object load, when the voltage of the low-voltage system is, due to some reason, below an output voltage of a DCDC converter which reduces the voltage of the high-voltage system and supplies the voltage to the backup object load, the electric power of the high-voltage system is supplied to the backup object load. As a result, the electric power is constantly supplied to the backup object load from the low-voltage system or the high-voltage system.

Meanwhile, a plurality of high-capacity smoothing condensers is arranged on the high-voltage system to stabilize the output electric power of the high-voltage system. For this reason, during the start of the vehicle, before the electric power is supplied to the motor and the vehicle starts to run, the high-voltage battery and the smoothing condenser are connected and a so-called pre-charge which charges the smoothing condenser is performed.

However, in the electric power system capable of supplying the electric power from the high-voltage system to the backup object load in the abovementioned way, during the pre-charge of the smoothing condenser, the electric power is supplied from the high-voltage battery to the backup object load, there is concern that the pre-charge is hindered, or it takes a long time to finish the pre-charge.

SUMMARY

An electric power system (for example, an electric power system 1 described below) of a vehicle (for example, a vehicle V described below) includes: a high-voltage circuit (for example, a high-voltage circuit 2 described below), which includes a main circuit (for example, a main circuit 29 described below) and a high-voltage battery (for example, a high-voltage battery 21 described below) connected to the main circuit; a low-voltage battery (for example, a low-voltage battery 31 described below), of which an output voltage is lower than that of the high-voltage battery; a system control part (for example, a system electronic control unit (ECU) 8 described below), which operates by the electric power supplied from the high-voltage circuit or the low-voltage battery and controls the main circuit; a first system control power line (for example, a first system control power line 32 described below), which connects the low-voltage battery and the system control part; a second system control power line (for example, a second system control power line 53 described below), which connects the high-voltage circuit and the system control part; a switch (for example, a second switch 59 described below), which is arranged on the second system control power line; and a switch control part (for example, a backup power supply ECU 57 described below), which opens the switch when the pre-charge of more than one condenser (for example, smoothing condensers C1, C2 described below) which are arranged on the main circuit is performed by supplying electric power to the high-voltage battery.

DESCRIPTION OF THE EMBODIMENTS

Figure 1:
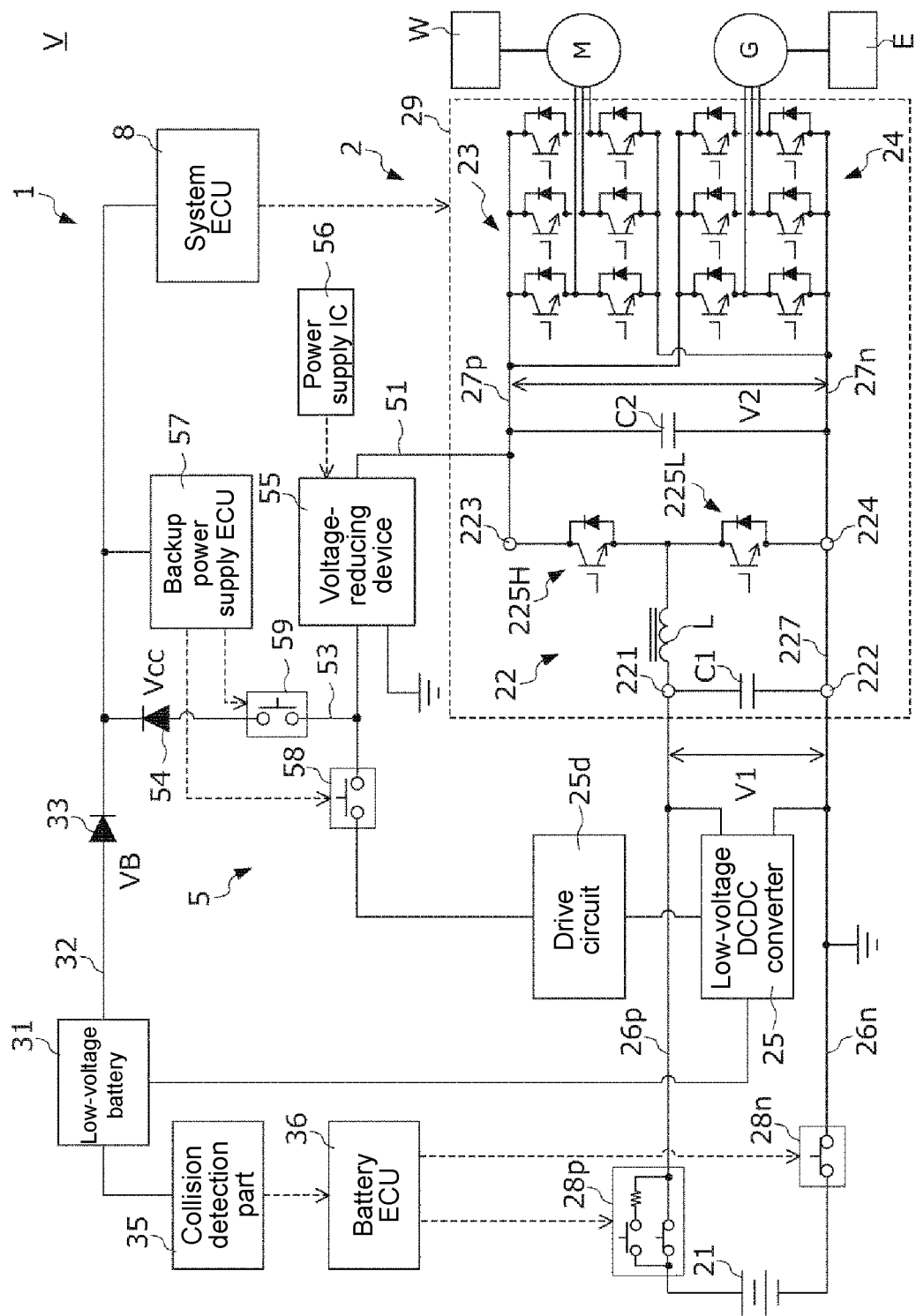
FIG. 1 is a diagram showing a structure of an electric vehicle on which an electric power system of an embodiment of the disclosure is mounted.

The disclosure provides an electric power system which uses a high-voltage circuit as a backup power supply of a low-voltage circuit, and which can quickly finishes a pre-charge of a condenser arranged in the high-voltage circuit.

In the disclosure, a voltage-reducing device (for example, a voltage-reducing device 55 described below) for reducing a voltage of the electric power from the high-voltage circuit is also included; one end of the second system control power line is connected to an output side of the voltage-reducing device, while the other end is connected to the first system control power line; on a side of the first system control power line that is closer to a low-voltage battery than a connecting point of the second system control power line, a first diode (for example, a first diode 33 described below) which permits a current from the low-voltage battery to the system control part is arranged, and on the second system control power line, a second diode (for example, a second diode 54 described below) which permits a current from the voltage-reducing device to the system control part is arranged; the voltage-reducing device preferably reduces the voltage of the electric power from the high-voltage circuit to a voltage that is within an operation voltage scope of the system control part and is lower than an output voltage in a normal state of the low-voltage battery.

In the disclosure, the system control part which controls the main circuit is connected to the low-voltage battery by the first system control power line, and the system control part is connected to the high-voltage circuit which includes the high-voltage battery by the second system control power line. In an ordinary vehicle, considering the maintainability by an operator, the system control part or the low-voltage battery which supplies electric power to vehicle auxiliary machines is arranged on a front side of the vehicle inside an engine room in most cases. For this reason, in a collision of the vehicle, a connection between the low-voltage battery and the system control part may disappear, and electric power cannot be supplied from the low-voltage battery to the system control part. In addition, even if the low-voltage battery is arranged inside the vehicle interior, in the collision of the vehicle, low-voltage system may cause layer short, and electric power cannot be supplied from the low-voltage battery to the system control part either. Besides, when the output voltage of the low-voltage battery decreases due to excessive degeneration of the low-voltage battery, there are also cases when the electric power cannot be supplied from the low-voltage battery to the system control part. In contrast, in the disclosure, when electric power cannot be supplied from the low-voltage battery to the system control part because the connection between the low-voltage battery and the system control part disappears, or layer short occurs in the low-voltage system, or the low-voltage battery degenerates excessively, the high-voltage circuit becomes a backup power supply of the low-voltage battery, and necessary electric power can be supplied from the high-voltage circuit to the system control part via the second system control power line.

Besides, in the electric power system which uses the high-voltage circuit as the backup power supply of the low-voltage battery in this way, as mentioned above, there is concern that the pre-charge of the condenser arranged on the main circuit is hindered. Therefore, in the disclosure, a switch is arranged on the second system control power line, and when the pre-charge of the more than one condenser arranged on the main circuit is performed, the switch is opened by the switch control part. As a result, during the pre-charge of the condenser, the electric connection between the condenser and the system control part is broken, and the electric power from the high-voltage battery is not supplied to the system control part, so that the pre-charge of the condenser can be finished quickly.

In the disclosure, the output side of the voltage-reducing device which reduces the voltage of the electric power from the high-voltage circuit is connected to the first system control power line by the second system control power line, the first diode is arranged on the side of the first system control power line that is closer to the low-voltage battery than the connecting point of the second system control power line, and the second diode is arranged on the second system control power line. Besides, in the disclosure, the electric power from the high-voltage circuit is reduced by the voltage-reducing device to a voltage which is within the operation voltage scope of the system control part and is lower than the output voltage in the state when the low-voltage battery is normal. Therefore, according to the disclosure, during the normal state when the connection between the low-voltage battery and the system control part does not disappear and the output voltage of the low-voltage battery does not decrease because of excessive degeneration, the electric power is supplied from the low-voltage battery with a higher potential to the system control part. Moreover, when malfunction occurs, for example, when the connection between the low-voltage battery and the system control part disappears due to the collision or when the output voltage of the low-voltage battery decreases due to excessive degeneration, the electric power from the high-voltage circuit can be supplied to the system control part via the second system control power line and the voltage-reducing device, and a control by the system control part can be continued. Besides, in the disclosure, by arranging diodes on the first system control power line and the second system control power line separately, the potential on the second system control power line side can be kept by the voltage-reducing device with the operation voltage scope of the system control part, and the electric power from the low-voltage battery can be supplied to the system control part via the first system control power line. Accordingly, when the vehicle collides, power supply of the system control part can be directly switched from the low-voltage battery to the voltage-reducing device side instead of detecting the collision and performing special control accordingly. Therefore, in the disclosure, the electric power can be continuously supplied to the system control part before and after the collision of the vehicle without interruption. Similarly, when the output voltage of the low-voltage battery is lower than the output voltage of the voltage-reducing device due to excessive degeneration, power supply of the system control part can also be switched from the low-voltage battery to the voltage-reducing device side. In addition, when the electric power from the high-voltage circuit may be constantly supplied to the system control part in this way, there is concern that the pre-charge of the condenser arranged on the main circuit is hindered. In contrast, in the disclosure, during the pre-charge of the condenser, the switch arranged on the second system control power line is opened as mentioned above, so that there is no concern of the pre-charge being hindered either.

In the following part, an embodiment of the disclosure is described with reference to the drawings.

FIG. 1 is a diagram showing a structure of an electric vehicle V (referred to as "vehicle" only hereinafter) on which an electric power system 1 of the embodiment is mounted. In addition, in the embodiment, a so-called hybrid vehicle including an engine E, an electric motor M and a power generator G is described as an example of the vehicle V, but the disclosure is not limited to this. The electric power system of the disclosure can be applied to, without being limited to the hybrid vehicle, any vehicle as long as the vehicle is a vehicle which uses electric power stored in a battery to run, such as an electric car or a fuel cell car.

The vehicle V includes the electric power system 1, the engine E, the electric motor M, the power generator G, and a drive wheel W. The electric motor M mainly generates a power with which the vehicle V runs. The electric motor M is connected to the drive wheel W. A torque generated in the electric motor M by supplying electric power from the electric power system 1 to the electric motor M is transmitted to the drive wheel W via a power transmission mechanism that is not shown, rotates the drive wheel W and makes the vehicle V run. Besides, the electric motor M functions as a power generator during a regenerative deceleration of the vehicle V. The electric power generated by the electric motor M is charged to a high-voltage battery 21 described below which is included in the electric power system 1.

The engine E is connected to the power generator G. The power generator G is driven by the power of the engine E and generates electric power. The electric power generated by the power generator G is charged to the high-voltage battery 21. In addition, the engine E is connected to the drive wheel W via a power transmission mechanism that is not shown, and the power of the engine E may be used to drive the drive wheel W.

The electric power system 1 includes a high-voltage circuit 2 arranged on the high-voltage battery 21, a low-voltage circuit arranged on a low-voltage battery 31, a backup power supply unit 5, and a system ECU 8.

The high-voltage circuit 2 includes: the high-voltage battery 21; a high-voltage DCDC converter 22; first power lines 26p, 26n, which connect a positive electrode and a negative electrode of the high-voltage battery 21 to a low-voltage side positive electrode terminal 221 and a low-voltage side negative electrode terminal 222 of the high-voltage DCDC converter 22; a first inverter 23; a second inverter 24; second power lines 27p, 27n, which connect a high-voltage side positive electrode terminal 223 and a high-voltage side negative electrode terminal 224 of the high-voltage DCDC converter 22 to a direct-current input-output side of each inverter 23, 24; a low-voltage DCDC converter 25, which is connected to the first power lines 26p, 26n; a drive circuit 25d of the low-voltage DCDC converter 25; and a second smoothing condenser C2, which is connected to the second power lines 27p, 27n.

The high-voltage battery 21 is a secondary battery capable of a discharge which converts chemical energy to electric energy and a charge which converts electric energy to chemical energy. In the following part, a situation in which a so-called lithium ion battery which performs charge and discharge by a movement of the lithium ion between electrodes is used as the high-voltage battery 21 is described, but the disclosure is not limited to this.

A positive electrode contactor 28p and a negative electrode contactor 28n are arranged separately on the first power lines 26p, 26n. The contactors 28p, 28n are normally open contactors which open to break a conduction between two electrodes of the high-voltage battery 21 and the first power lines 26p, 26n in a state when a command signal from outside is not input, and close to connect the high-voltage battery 21 and the first power lines 26p, 26n in a state when the command signal is input. In accordance with the command signal transmitted from a battery ECU 36, the contactors 28p, 28n use the electric power supplied from the low-voltage battery 31 to open and close. In addition, the positive electrode contactor 28p becomes a pre-charge contactor which has a pre-charge resistance for relaxing an inrush current to a plurality of smoothing condensers arranged on the high-voltage circuit 2.

The high-voltage DCDC converter 22 is arranged between the first power lines 26p, 26n and the second power lines 27p, 27n. The low-voltage side positive electrode terminal 221 and the low-voltage side negative electrode terminal 222 of the high-voltage DCDC converter 22 are connected to the high-voltage battery 21 via the first power lines 26p, 26n separately as described above. The high-voltage side positive electrode terminal 223 and the high-voltage side negative electrode terminal 224 of the high-voltage DCDC converter 22 are connected to the first inverter 23 and the second inverter 24 via the second power lines 27p, 27n separately as described above.

The high-voltage DCDC converter 22 is a bidirectional DCDC converter which is formed by a combination of a reactor L, a first smoothing condenser C1, a high-arm element 225H, a low-arm element 225L, and a negative bus 227.

The negative bus 227 is a wiring which connects the low-voltage side negative electrode terminal 222 and the high-voltage side negative electrode terminal 224. One end side of the first smoothing condenser C1 is connected to the low-voltage side positive electrode terminal 221, and the other end side is connected to the negative bus 227. One end side of the reactor L is connected to the low-voltage side positive electrode terminal 221, and the other end side is connected to a connection node of the high-arm element 225H and the low-arm element 225L.

The high-arm element 225H includes an existing power switching element such as an IGBT or a MOSFET, and a diode connected in parallel to the power switching element. The low-arm element 225L includes an existing power switching element such as an IGBT or a MOSFET, and a diode connected in parallel to the power switching element. The high-arm element 225H and the low-arm element 225L are connected in series in this order between the high-voltage side positive electrode terminal 223 and the negative bus 227.

A collector of the power switching element of the high-arm element 225H is connected to the high-voltage side positive electrode terminal 223, and an emitter of the power switching element of the high-arm element 225H is connected to a collector of the low-arm element 225L. An emitter of the power switching element of the low-arm element 225L is connected to the negative bus 227. A forward direction of the diode arranged on the high-arm element 225H is a direction heading from the reactor L toward the high-voltage side positive electrode terminal 223. Besides, a forward direction of the diode arranged on the low-arm element 225L is a direction heading from the negative bus 227 toward the reactor L.

The high-arm element 225H and the low-arm element 225L are separately turned on or off by a gate drive signal generated by a gate drive circuit (not shown) included in the system ECU 8.

The high-voltage DCDC converter 22 fulfills a voltage-raising function and a voltage-reducing function by driving the element 225H, 225L ON/OFF according to the gate drive signal generated from the gate drive circuit of the system ECU 8 in a predetermined timing. The voltage-raising function is a function which raises a voltage applied to the terminals 221, 222 on the low-voltage side and outputs the voltage to the terminals 223, 224 on the high-voltage side, by which a current flows from the first power lines 26p, 26n to the second power lines 27p, 27n. Besides, the voltage-reducing function is a function which reduces a voltage applied to the terminals 223, 224 on the high-voltage side and outputs the voltage to the terminals 221, 222 on the low-voltage side, by which a current flows from the second power lines 27p, 27n to the first power lines 26p, 26n. In addition, in the following part, a potential difference between the first power lines 26p and 26n is referred as V1, and a potential difference between the second power lines 27p and 27n is referred to as V2.

The first inverter 23 and the second inverter 24 are, for example, pulse width modulation PWM inverters including a bridge circuit formed by bridge connecting a plurality of switching elements (for example, IGBT), and have a function of converting a direct-current electric power and an alternating-current electric power. The first inverter 23 is connected to the second power lines 27p, 27n on the direct-current input-output side, and is connected to a U-phase coil, a V-phase coil and a W-phase coil of the electric motor M on the alternating-current input-output side. The second inverter 24 is connected to the second power lines 27p, 27n on the direct-current input-output side, is connected to a U-phase coil, a V-phase coil and a W-phase coil of the power generator G on the alternating-current input-output side.

The first inverter 23 is framed by bridge connecting, in each phase, a high-side U-phase switching element and a low-side U-phase switching element which are connected to the U-phase of the electric motor M, a high-side V-phase switching element and a low-side V-phase switching element which are connected to the V-phase of the electric motor M, and a high-side W-phase switching element and a low-side W-phase switching element which are connected to the W-phase of the electric motor M.

By driving the switching elements of each phase ON/OFF according to the gate drive signal generated from the gate drive circuit of the system ECU 8 in a predetermined timing, the first inverter 23 converts the direct-current electric power supplied from the high-voltage DCDC converter 22 to an alternating-current electric power and supplies to the electric motor M, or converts the alternating-current electric power supplied from the electric motor M to a direct-current electric power and supplies to the high-voltage DCDC converter 22.

The second inverter 24 is formed by bridge connecting, in each phase, a high-side U-phase switching element and a low-side U-phase switching element which are connected to the U-phase of the power generator G, a high-side V-phase switching element and a low-side V-phase switching element which are connected to the V-phase of the power generator G, and a high-side W-phase switching element and a low-side W-phase switching element which are connected to the W-phase of the power generator G.

By driving the switching elements of each phase ON/OFF according to the gate drive signal generated from the gate drive circuit of the system ECU 8 in a predetermined timing, the second inverter 24 converts the direct-current electric power supplied from the high-voltage DCDC converter 22 to an alternating-current electric power and supplies to the electric motor G, or converts the alternating-current electric power supplied from the electric motor G to a direct-current electric power and supplies to the high-voltage DCDC converter 22.

The low-voltage DCDC converter 25 is connected in parallel with the high-voltage DCDC converter 22 to the first power lines 26p, 26n. By using the electric power supplied from the backup power supply unit 5 to drive the switching element of the low-voltage DCDC converter 25 ON/OFF, the drive circuit 25d reduces the voltage V1 between the first power lines 26p, 26n and supplies the voltage to the low-voltage battery 31 to charge the low-voltage battery 31.

The system ECU 8 is a microcomputer which is responsible for a running control of the vehicle V, more specifically, a control of the main circuit 29 including the high-voltage DCDC converter 22, the first inverter 23, the second inverter 24, and the second smoothing condenser C2 in the high-voltage circuit 2. The system ECU 8 uses the electric power supplied from the low-voltage battery 31 or the backup power supply unit 5 to operate. When a start switch (not shown) is turned on by a driver to start the electric power system 1, the system ECU 8 starts under the electric power supplied from the low-voltage battery 31, and then uses the electric power supplied from the low-voltage battery 31 or the backup power supply unit 5 to operate.

The low-voltage circuit includes the low-voltage battery 31, a first system control power line 32, a first diode 33, a collision detection part 35 and a battery ECU 36.

The low-voltage battery 31 is a secondary battery capable of a discharge which converts chemical energy to electric energy and a charge which converts electric energy to chemical energy. In the embodiment, a situation is described in which a lead battery using lead in an electrode is used as the battery 3, but the disclosure is not limited to this. Besides, in the following part, a situation is described in which the output voltage of the low-voltage battery 31 is lower than the output voltage of the high-voltage battery 21. In addition, in the following part, a situation is described in which the low-voltage battery 31 is arranged, with consideration of the maintainability by the operator, on a vehicle front side in an un-illustrated engine room of the vehicle V, but the disclosure is not limited to this.

The first system control power line 32 is a power-feeding line which connects the low-voltage battery 31 with a backup power supply ECU 57 and the system ECU 8, and supplies electric power from the low-voltage battery 31 to the backup power supply ECU 57 and the system ECU 8. In addition, in the following part, a voltage of the first system control power line 32, namely the output voltage of the low-voltage battery 31 is referred to as VB.

The first diode 33 is arranged on the first system control power line 32. A forward direction of the first diode 33 is a direction heading from the low-voltage battery 31 toward the backup power supply ECU 57 and the system ECU 8, and permits a current from the low-voltage battery 31 to the backup power supply ECU 57 and the system ECU 8.

The collision detection part 35 determines whether the vehicle V collides or overturns by using a detection signal of an acceleration sensor (not shown), and transmits a collision detection signal to the battery ECU 36 when a collision or overturning is determined. The collision detection part 35 uses the electric power supplied from the low-voltage battery 31 to operate.

The battery ECU 36 is a microcomputer which is responsible for a control related to monitoring of ON/OFF of the contactors 28p, 28n or the state of the high-voltage battery 21 and the low-voltage battery 31. The battery ECU 36 uses the electric power supplied from the low-voltage battery 31 to operate.

When the start switch is turned on by the driver, the battery ECU 36 starts under the electric power supplied from the low-voltage battery 31, and starts the pre-charge of a plurality of smoothing condensers C1-C2 arranged on the high-voltage circuit 2. More specifically, the battery ECU 36 performs the pre-charge of the smoothing condensers C1-C2 by turning on the contactors 28p, 28n and connecting the high-voltage battery 21 to the first power lines 26p, 26n. In addition, when performing the pre-charge of the smoothing condensers C1-C2, the battery ECU 36 turns on the negative electrode contactor 28n, and turns a contactor with a pre-charge resistance in the positive electrode contactor 28p. Besides, after the pre-charge of the smoothing condensers C1-C2 is finished, the battery ECU 36 turns on a contactor without a pre-charge resistance in the positive electrode contactor 28p. Accordingly, an inrush current to the smoothing condensers C1-C2 during the implementation of the pre-charge can be relaxed.

Besides, the battery ECU 36 and the backup power supply ECU 57 described below can perform a CAN communication via a CAN bus that is not shown. Accordingly, during the pre-charge of the smoothing condensers C1-C2 performed by procedures as mentioned above, the battery ECU 36 transmits a CAN signal showing that the pre-charge of the smoothing condensers C1-C2 is being implemented to the backup power supply ECU 57 so that that the pre-charge being performed is not hindered.

Besides, after the contactors 28p, 28n are turned on in the abovementioned way, when the start switch is turned off by the driver to stop the electric power system 1, or when a collision detection signal is received from the collision detection part 35, the battery ECU 36 turns off the contactors 28p, 28n and disconnects the high-voltage battery 21 from the first power lines 26p, 26n.

The backup power supply unit 5 includes a third power line 51, a second system control power line 53, a second diode 54, a voltage-reducing device 55, a power supply IC 56, the backup power supply ECU 57, a first switch 58, and a second switch 59.

The third power line 51 is a power-feeding line which connects the second power line 27p of the high-voltage circuit 2 and the drive circuit 25d of the low-voltage DCDC converter 25, and supplies electric power from the second power line 27p to the drive circuit 25d.

The voltage-reducing device 55 is arranged on the third power line 51. The voltage-reducing device 55 is an insulating DCDC converter which includes: a transformer, of which a primary side is connected to the second power line 27p side, and a secondary side is connected to the drive circuit 25d side; and a switching element, which interrupts a current flowing to the primary side of the transformer. After the start switch is turned on and the contactors 28p, 28n are turned on in the abovementioned way, by using the electric power supplied from the first power line 26p (or the second power line 27p) to drive the switching element of the voltage-reducing device 55 ON/OFF, the power supply IC 56 reduces a voltage of the electric power supplied from the second power line 27p and outputs the electric power to the drive circuit 25d side.

The first switch 58 is arranged on the side of the third power line 51 that is closer to the drive circuit 25d than the voltage-reducing device 55, and interrupts the connection between the voltage-reducing device 55 and the drive circuit 25d. The first switch 58 is a normally open switch which opens to break the conduction between the voltage-reducing device 55 and the drive circuit 25d in a state when a command signal from outside is not input, and closes to connect the voltage-reducing device 55 and the drive circuit 25d in a state when the command signal is input. The first switch 58 opens and closes in accordance with the command signal transmitted from the backup power supply ECU 57.

The second system control power line 53 is a power-feeding line which connects a position in the third power line 51 and between the first switch 58 and the voltage-reducing device 55 with the side of the first system control power line 32 that is closer to a backup power supply ECU 57 and system ECU 8 than the first diode 33, and supplies electric power from the voltage-reducing device 55 to the backup power supply ECU 57 and the system ECU 8. In addition, in the following part, a voltage of the second system control power line 53, namely the output voltage of the voltage-reducing device 55 is referred to as Vcc. In addition, in the following part, a situation is described in which the second system control power line 53 is connected to the first system control power line 32, but the disclosure is not limited to this. The second system control power line 53 may also be directly connected to the backup power supply ECU 57 and the system ECU 8 without using the first system control power line 32.

The second switch 59 is arranged on the second system control power line 53, and interrupts the connection of the voltage-reducing device 55 with the backup power supply ECU 57 and the system ECU 8. The second switch 59 is a normally open switch which opens to break the conduction of the voltage-reducing device 55 with the backup power supply ECU 57 and the system ECU 8 in a state when a command signal from outside is not input, and closes to connect the voltage-reducing device 55 with the backup power supply ECU 57 and the system ECU 8 in a state when the command signal is input. The second switch 59 opens and closes in accordance with the command signal transmitted from the backup power supply ECU 57.

The second diode 54 is arranged on the side of the second system control power line 53 that is closer to the first system control power line 32 than the second switch 59. A forward direction of the second diode 54 is a direction heading from the voltage-reducing device 55 toward the backup power supply ECU 57 and the system ECU 8, and permits a current from the voltage-reducing device 55 to the backup power supply ECU 57 and the system ECU 8.

Here, a setting of the output voltage Vcc of the voltage-reducing device 55 is described. As shown in FIG. 1, the low-voltage battery 31 and the voltage-reducing device 55, which are electric power supply source, are connected separately via the diodes 33, 54 to the system ECU 8 which is responsible for the running control of the vehicle V. For this reason, in the system ECU 8, electric power may be selectively supplied from one of the two electric power supply sources with a higher potential. In the embodiment, the low-voltage battery 31 is set as a main power supply of the system ECU 8, and the voltage-reducing device 55 is used as a backup power supply when a failure occurs in the low-voltage battery 31 (more specifically, when the connection between the low-voltage battery 31 and the system ECU 8 disappears due to the collision of the vehicle V, or when the low-voltage battery 31 is not in a normal state), so that the output voltage Vcc of the voltage-reducing device 55 is set so as to be lower than the output voltage VB which is within the operation voltage scope of the system ECU 8 and is a voltage in the normal state of the low-voltage battery 31. Here, the abnormal state of the low-voltage battery 31 means, for example, a state in which the output voltage of the low-voltage battery 31 is much lower, due to an excessive degeneration of the low-voltage battery 31, than the voltage of the time when it is newly made.

The backup power supply ECU 57 is a microcomputer responsible for a control related to the ON/OFF of the first switch 58 and the second switch 59. The backup power supply ECU 57 uses the electric power supplied from the low-voltage battery 31 or the backup power supply unit 5 to operate.

When the start switch is turned on by the driver, similar to the system ECU 8, the backup power supply ECU 57 starts under the electric power supplied from the low-voltage battery 31, and then uses the electric power supplied from the low-voltage battery 31 or the backup power supply unit 5 to operate. Besides, after starting under the electric power supplied from the low-voltage battery 31, the backup power supply ECU 57 turns on both the first switch 58 and the second switch 59, and becomes a state capable of supplying electric power from the voltage-reducing device 55 to the drive circuit 25d, the backup power supply ECU 57, and the system ECU 8.

On the other hand, when the start switch is turned on as mentioned above, the contactors 28p, 28n are turned on by the battery ECU 36, and the pre-charge of the smoothing condensers C1-C2 is performed. Accordingly, while a CAN signal showing that the pre-charge of the smoothing condensers C1-C2 is being implemented is received from the battery ECU 36, the backup power supply ECU 57 turns on at least the second switch 59 in the first switch 58 and the second switch 59 in a way that the pre-charge of the smoothing condensers C1-C2 is not hindered. After that, when the pre-charge of the smoothing condensers C1-C2 is finished, and a CAN signal showing that the pre-charge is finished is received from the battery ECU 36, the backup power supply ECU 57 turns on the switch which is in an off state till then. Besides, by starting the pre-charge of the smoothing condensers C1-C2 as mentioned above, if the voltage V1 or V2 exceeds a predetermined threshold, the power supply IC 56 starts the voltage-reducing device 55, and uses the output electric power of the voltage-reducing device 55 to start the drive of the low-voltage DCDC converter 25 by the drive circuit 25d.

Next, an operation example of the electric power system 1 is described with reference to FIG. 2 and FIG. 3.

Figure 2:
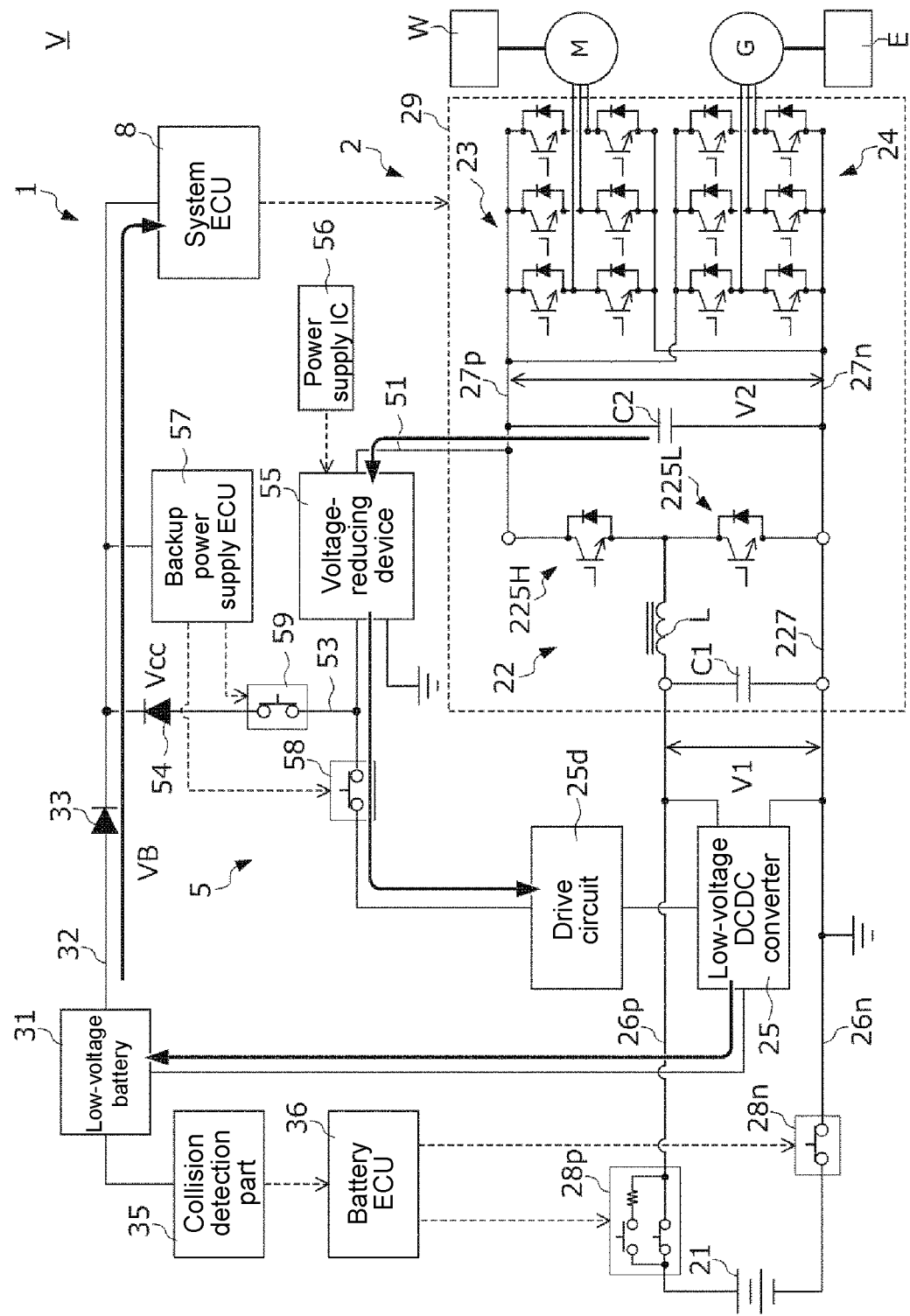
FIG. 2 is a diagram schematically showing an operation example of the electric power system in a normal running of the vehicle.

FIG. 2 is a diagram schematically showing an operation example of the electric power system 1 in the normal running of the vehicle V. Here, in the normal running means, more specifically, after the pre-charge of the smoothing condensers C1-C2 is finished.

As mentioned above, the backup power supply ECU 57 turns on both the first switch 58 and the second switch 59 in the normal running, and the voltage-reducing device 55 reduces the voltage of the electric power supplied from the second power line 27p and outputs the electric power. The drive circuit 25d consumes the output electric power of the voltage-reducing device 55 to drive the low-voltage DCDC converter 25. As a result, the low-voltage DCDC converter 25 reduces a voltage of the electric power supplied from the first power line 26p and charges the low-voltage battery 31. In addition, at this moment, the output voltage Vcc of the voltage-reducing device 55 is set so as to be lower than the output voltage VB of the low-voltage battery 31 in this way. For this reason, the electric power from the low-voltage battery 31 with a higher potential is supplied to the backup power supply ECU 57 and the system ECU 8. The system ECU 8 operates by the electric power supplied from the low-voltage battery 31 and controls the main circuit 29.

Figure 3:
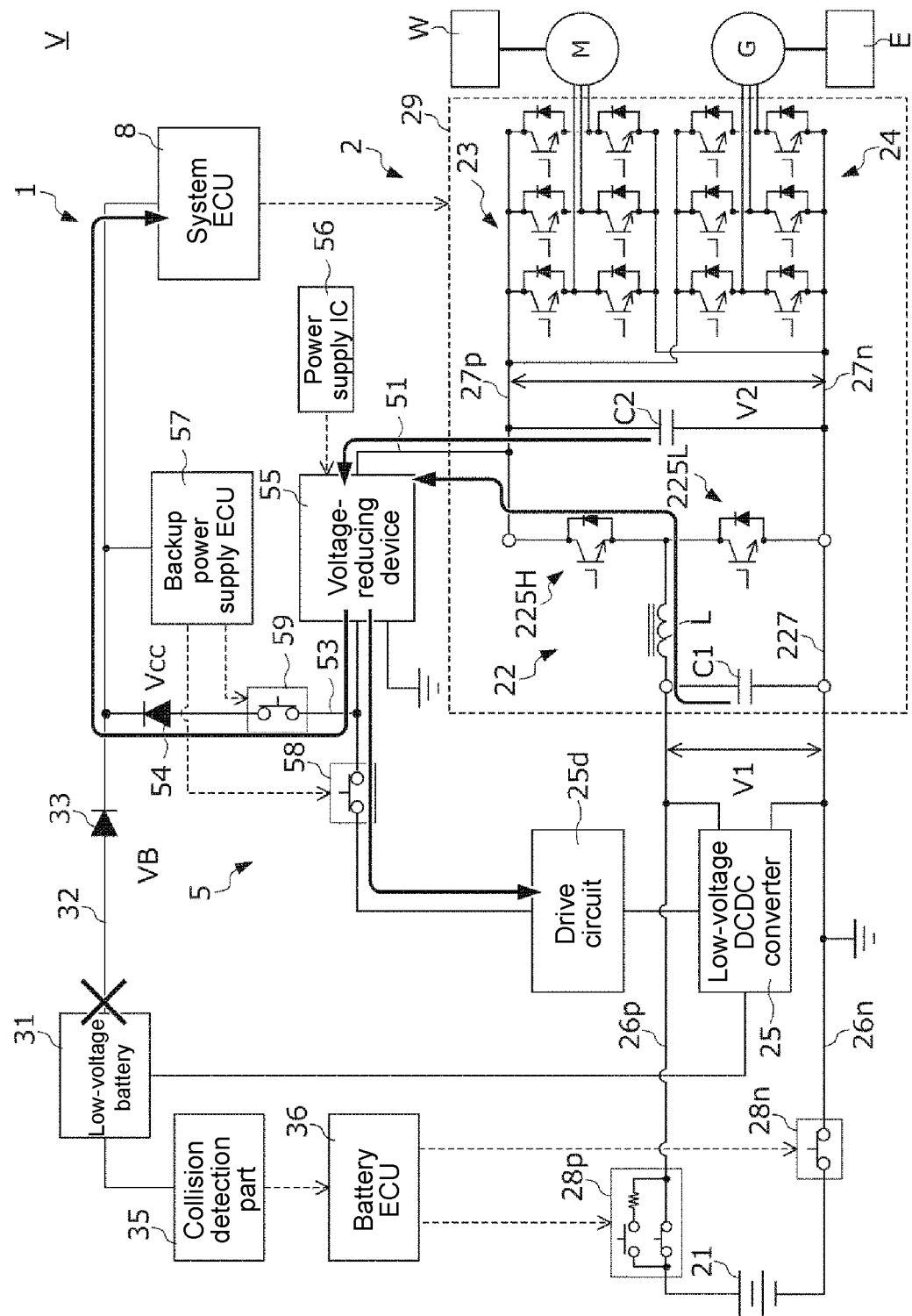
FIG. 3 is a diagram schematically showing an operation example of the electric power system when the vehicle in the normal running collides with an object and a connection of a low-voltage battery with a backup power supply ECU and a system ECU disappears.

FIG. 3 is a diagram schematically showing an operation example of the electric power system 1 when the vehicle V in the normal running collides with an object and a connection of the low-voltage battery 31 with the backup power supply ECU 57 and the system ECU 8 disappears. In addition, for example, when the voltage of the low-voltage battery 31 decreases due to an occurrence of layer short in the low-voltage system to which the electric power from the low-voltage battery 31 is supplied, the operation is also the same.

When the vehicle V collides, the battery ECU 36 turns the contactors 28p, 28n off and disconnects the high-voltage battery 21 from the first power lines 26p, 26n as mentioned above.

In addition, immediately after the high-voltage battery 21 is disconnected from the first power lines 26p, 26n, a large amount of electric charge remains in the smoothing condensers C1-C2 arranged on the high-voltage circuit 2, therefore it is necessary to discharge quickly and quickly decrease the potential of the high-voltage circuit 2. Accordingly, the voltage-reducing device 55 reduces the voltage of the electric power supplied from the smoothing condensers C1, C2 via the second power line 27p and supplies the electric power to the drive circuit 25d. The drive circuit 25d uses the electric power supplied from the voltage-reducing device 55 to drive the switching element of the low-voltage DCDC converter 25 ON/OFF, thereby consuming the electric power remaining in the smoothing condensers C1-C2.

Besides, when the connection between the low-voltage battery 31 and the system ECU 8 disappears due to the collision of the vehicle V, the output voltage Vcc of the voltage-reducing device 55 is higher than the output voltage VB of the low-voltage battery 31, and a state is achieved in which the electric power can be supplied from the voltage-reducing device 55 to the backup power supply ECU 57 and the system ECU 8. Accordingly, the voltage-reducing device 55 reduces the voltage of the electric power supplied from the smoothing condensers C1, C2 via the second power line 27p, and as mentioned above, supplies the electric power to the drive circuit 25d as well as the backup power supply ECU 57 and the system ECU 8, thereby consuming the electric power remaining in the smoothing condensers C1-C2 by the backup power supply ECU 57 and the system ECU 8.

Besides, after the collision of the vehicle V, the system ECU 8 uses the electric power supplied from the backup power supply unit 5 to operate as mentioned above, and performs, for example, a control which stops an idling of the electric motor 3, or a discharge control which actively consumes the electric power stored in the smoothing condensers C1-C2.

As mentioned above, immediately after the collision of the vehicle V, the electric power remaining in the smoothing condensers C1-C2 is supplied to the drive circuit 25d, the backup power supply ECU 57, and the system ECU 8 via the backup power supply unit 5 and consumed by these parts, therefore the potential of the high-voltage circuit 2 can be quickly reduced. Here, as shown in FIG. 3, the electric power remaining in the first smoothing condenser C1 is supplied to the voltage-reducing device 55 via the reactor L, the diode of the high-arm element 225H, the second power line 27p and the third power line 51. Besides, as shown in FIG. 3, the electric power remaining in the second smoothing condenser C2 is supplied to the voltage-reducing device 55 via the second power line 27p and the third power line 51.

Here, an advantage of connecting the third power line 51 to the second power line 27p of the high-voltage circuit 2 is described by a comparison with a situation in which the third power line is connected to the first power line 26p of the high-voltage circuit 2. The second smoothing condenser C2 is connected in parallel with respect to a serial connection body of the high-arm element 225H and the low-arm element 225L of the high-voltage DCDC converter 22. For this reason, when the third power line is connected to the first power line 26p, the electric charge remaining in the second smoothing condenser C2 cannot be supplied to the voltage-reducing device 55 unless the high-arm element 225H is turned on. On the contrary, in the electric power system 1, by connecting the third power line 51 to the second power line 27p, when the vehicle V collides, the electric charge remaining in the two smoothing condensers C1-C2 is quickly supplied to the voltage-reducing device 55 via the third power line 51 and can be consumed by the drive circuit 25d.

Figure 4:
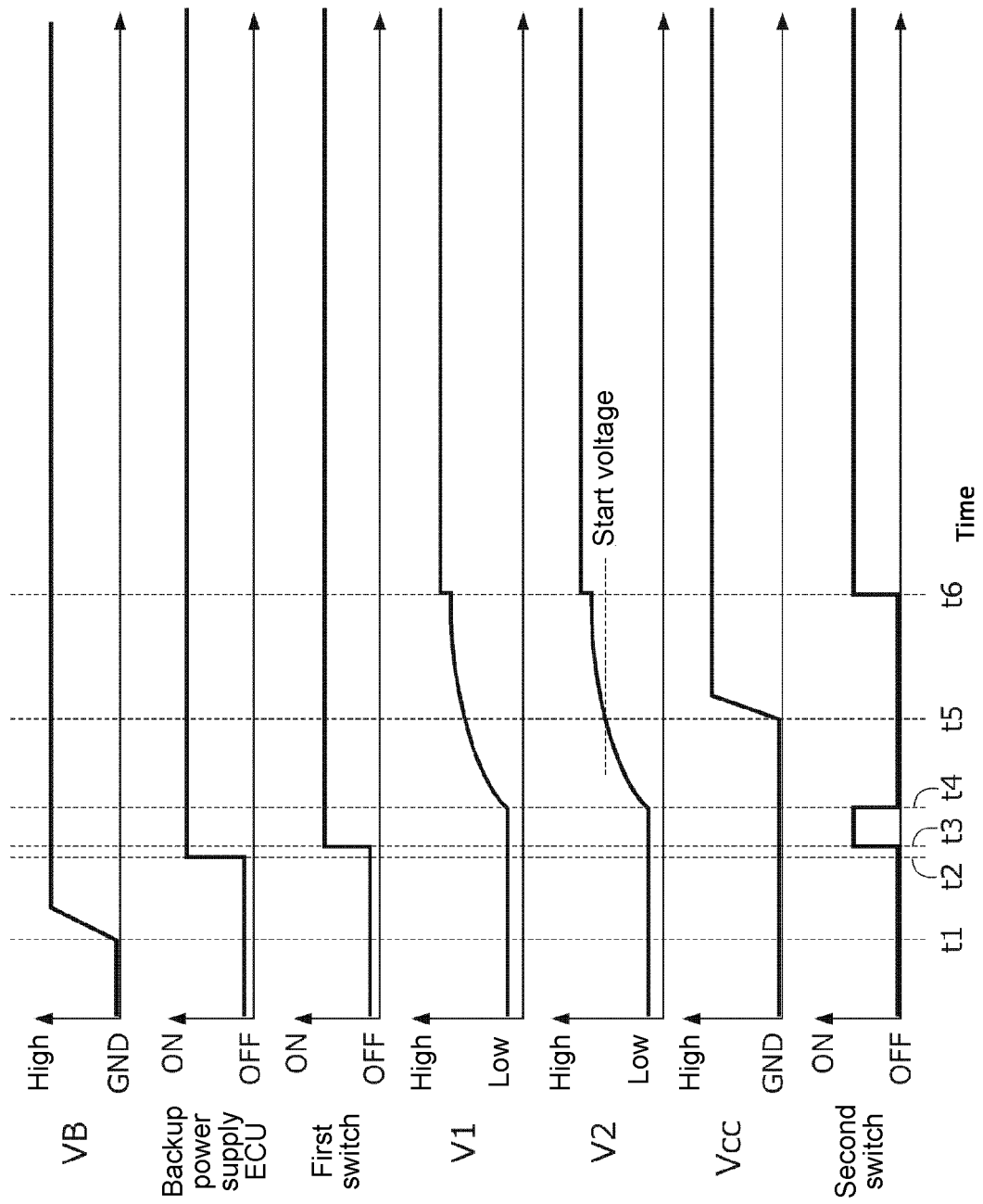
FIG. 4 is a time chart for describing procedures of a start treatment of the electric power system.

Next, a start treatment of the electric power system 1 is described with reference to FIG. 4. FIG. 4 is a time chart for describing procedures of the start treatment of the electric power system 1. In FIG. 4, the output voltage VB of the low-voltage battery 31, the backup power supply ECU 57, the first switch 58, the voltage V1 between the first power lines 26p, 26n of the high-voltage circuit 2, the voltage V2 between the second power lines 27p, 27n of the high-voltage circuit 2, the output voltage Vcc of the voltage-reducing device 55, and the second switch 59 are sequentially shown from the top.

At the beginning, at time t1, the start switch is turned on in order to start the electric power system 1, the output voltage VB of the low-voltage battery 31 rises accordingly, and the electric power from the low-voltage battery 31 is started to be supplied to the backup power supply ECU 57, the system ECU 8, and the battery ECU 36. After that, at time t2, the backup power supply ECU 57 rises. At time t3, the backup power supply ECU 57 turns the first switch 58 and the second switch 59 on and connects the voltage-reducing device 55 to the drive circuit 25d of the low-voltage DCDC converter 25.

After that, at time t4, the battery ECU 36 turns on the contactors 28p, 28n to connect the high-voltage battery 21 to the smoothing condensers C1-C2, and starts the pre-charge of the smoothing condensers C1-C2. As a result, after time t4, the voltage V1, V2 of the high-voltage circuit 2 starts to increase. Moreover, at time t4, the backup power supply ECU 57 receives, from the battery ECU 36, a CAN signal showing that the pre-charge of the smoothing condensers C1-C2 is being implemented; accordingly, a portion of the electric power necessary for the pre-charge is supplied to the system ECU 8 or the backup power supply ECU 57, and the second switch 59 is turned off so that the pre-charge is not hindered.

After that, at time t5, the voltage V1 between the first power lines 26p, 26n (or the voltage V2 between the second power lines 27p, 27n) exceeds a predetermined start voltage; accordingly, the power supply IC 56 starts and the output voltage Vcc of the voltage-reducing device 55 rises. However, at this time, the backup power supply ECU 57 turns the second switch 59 off, so that the output electric power of the voltage-reducing device 55 is not supplied to the backup power supply ECU 57 or the system ECU 8.

After that, at time t6, the voltage V1, V2 of the high-voltage circuit 2 increase up to the predetermined threshold; accordingly, the battery ECU 36 determines that the pre-charge of the smoothing condensers C1-C2 is finished, and transmits a CAN signal expressing this meaning to the backup power supply ECU 57. The backup power supply ECU 57 turns on the second switch 59 which is off till then according to the receiving of the CAN signal. As a result, the conduction of the voltage-reducing device 55 with the backup power supply ECU 57 and the system ECU 8 is achieved, and after time t6, the electric power can be supplied from the voltage-reducing device 55 to the ECU 57 and the ECU 8.

According to the electric power system 1 of the embodiment, the following effects can be achieved.

(1) In the electric power system 1, the system ECU 8 controlling the main circuit 29 is connected to the low-voltage battery 31 by the first system control power line 32, and the system ECU 8 is connected to the high-voltage circuit 2 including the high-voltage battery 21 via the second system control power line 53 and the voltage-reducing device 55. In the electric power system 1, when the electric power cannot be supplied from the low-voltage battery 31 to the system ECU 8 because the connection of the low-voltage battery 31 and the system ECU 8 disappears due to a collision, or because layer short occurs in the low-voltage system, or because the low-voltage battery 31 degenerates excessively, the backup power supply unit 5 sets the high-voltage circuit 2 as the backup power supply of the low-voltage battery 31, and is able to supply necessary electric power from the high-voltage circuit 2 to the system ECU 8 via the second system control power line 53 and the voltage-reducing device 55.

Besides, as mentioned above, in the electric power system 1 which uses the high-voltage circuit 2 as the backup power supply of the low-voltage battery 31 in this way, there is concern that the pre-charge of the smoothing condensers C1-C2 arranged on the main circuit 29 is hindered. Accordingly, in the electric power system 1, the second switch 59 is arranged on the second system control power line 53, and when performing the pre-charge of the smoothing condensers C1-C2 arranged on the main circuit 29, the second switch 59 is turned off by the backup power supply ECU 57. As a result, during the pre-charge of the smoothing condensers C1-C2, the electric connection between the smoothing condensers C1-C2 and the system ECU 8 is blocked, and the electric power from the high-voltage battery 21 is not supplied to the system ECU 8, so that the pre-charge of the smoothing condensers C1-C2 can be quickly finished.

(2) In the electric power system 1, the output side of the voltage-reducing device 55 is connected to the first system control power line 32 by the second system control power line 53, the first diode 33 is arranged on the side of the first system control power line 32 that is closer to the low-voltage battery 31 than the connecting point of the second system control power line 53, and the second diode 54 is arranged on the second system control power line 53. Besides, in the electric power system 1, the voltage of the electric power from the high-voltage circuit 2 is reduced by the voltage-reducing device 55 to a voltage which is within the operation voltage scope of the system ECU 8 and is lower than the output voltage in the normal state of the low-voltage battery 31. Therefore, according to the electric power system 1, in the normal state when the connection between the low-voltage battery 31 and the system ECU 8 does not disappear and the output voltage of the low-voltage battery 31 does not decrease due to excessive degeneration, electric power is supplied from the low-voltage battery 31 with a higher potential to the system ECU 8. Besides, when malfunction occurs, for example, when the connection between the low-voltage battery 31 and the system ECU 8 disappears due to collision or when the output voltage of the low-voltage battery 31 decreases due to excessive degeneration, the electric power from the high-voltage circuit 2 can be supplied to the system ECU 8 via the second system control power line 53 and the voltage-reducing device 55, and the control by the system ECU 8 can be continued. In addition, in the electric power system 1, the diodes 33, 54 are arranged separately on the system control power lines 32, 53, by which the potential on the second system control power line 53 side can be maintained within the operation voltage scope of the system ECU 8 by the voltage-reducing device 55, and the electric power from the low-voltage battery 31 can be supplied to the system ECU 8 via the first system control power line 32. As a result, when the vehicle V collides, the power supply of the system ECU 8 can be directly switched from the low-voltage battery 31 to the voltage-reducing device 55 side instead of detecting the collision and performing special control accordingly. Therefore, in the electric power system 1, electric power can be continuously supplied to the system ECU 8 before and after the collision of the vehicle V without interruption. Similarly, when the output voltage VB of the low-voltage battery 31 is lower than the output voltage Vcc of the voltage-reducing device 55 due to excessive degeneration, the power supply of the system ECU 8 can also be switched from the low-voltage battery 31 to the voltage-reducing device 55 side. In addition, when the electric power from the high-voltage circuit 2 can be constantly supplied to the system ECU 8 in this way, there is concern that the pre-charge of the smoothing condensers C1-C2 arranged on the main circuit 29 is hindered. In contrast, in the electric power system 1, as mentioned above, the second switch 59 arranged on the second system control power line 53 is turned off during the pre-charge of the smoothing condensers C1-C2, so that there is no concern that the pre-charge is hindered.

In the above, one embodiment of the disclosure is described, but the disclosure is not limited to this. Detailed structure may be properly altered within the scope of the spirit of the disclosure. For example, detailed circuit structures of the high-voltage DCDC converter 22, the first inverter 23, and the second inverter 24 are not limited to the structures shown in FIG. 1-FIG. 3. In particular, other existing circuits besides the circuits shown in FIG. 1-FIG. 3, such as a multilevel chopper circuit, an interleaving circuit, and a circuit with magnetic coupling, may be used as the high-voltage DCDC converter 22. For example, the multilevel chopper circuit includes a condenser which is independent of the first smoothing condenser C1 and is arranged in parallel to a serial connection body of the switching element or the diode. During the collision of the vehicle V, similar to the second smoothing condenser C2, the condenser can quickly supply the remaining electric charge to the voltage-reducing device 55 via the third power line 51 and consume the electric charge by the drive circuit 25d. For this reason, the multilevel chopper circuit has many advantages when applied to the disclosure.

Besides, in the abovementioned embodiment, the situation is described in which the backup power supply ECU 57 turns the first switch 58 on and turns the second switch 59 off while the pre-charge of the smoothing condensers C1-C2 is performed by the battery ECU 36, but the disclosure is not limited to this. According to the abovementioned embodiment, by turning the first switch 58 on even when the pre-charge is performed, a state can be achieved in which the low-voltage DCDC converter 25 can be quickly utilized because the voltage-reducing device 55 is connected to the drive circuit 25d of the low-voltage DCDC converter 25. However, when the consumed electric power of the drive circuit 25d increases, there is also concern that the pre-charge is hindered if the first switch 58 is continued to be turned on even when the pre-charge is performed. Therefore, in such a case, the backup power supply ECU 57 may turn off both the second switch 59 and the first switch 58 while the pre-charge of the smoothing condensers C1-C2 is performed by the battery ECU 36.

What is claimed is:

1. An electric power system of a vehicle, comprising:
a high-voltage circuit comprising a main circuit and a high-voltage battery connected to the main circuit;
a low-voltage battery, of which an output voltage is lower than that of the high-voltage battery;
a system control part, which operates by electric power supplied from the high-voltage circuit or the low-voltage battery and controls the main circuit;
a first system control power line, which connects the low-voltage battery to the system control part;
a second system control power line, which connects the high-voltage circuit to the system control part;
a switch, which is arranged on the second system control power line; and
a voltage-reducing device which reduces a voltage of the electric power from the high-voltage circuit, wherein
one end of the second system control power line is connected to an output side of the voltage-reducing device, and the other end is connected to the first system control power line,
on a side of the first system control power line that is closer to the low-voltage battery than a connecting point of the second system control power line, a first diode which permits a current from the low-voltage battery to the system control part is arranged,
on the second system control power line, a second diode which permits a current from the voltage-reducing device to the system control part is arranged; and
a switch control part, which configured to:
open the switch when a pre-charge of more than one condenser arranged on the main circuit is performed by supplying electric power of the high-voltage battery, and
close when the pre-charge of more than one condenser is finished, and
the voltage-reducing device reduces the voltage of the electric power from the high-voltage circuit to a voltage which is within an operation voltage scope of the system control part and is lower than an output voltage in a normal state of the low-voltage battery.

2. An electric power system of a vehicle, comprising:
a high-voltage circuit comprising a main circuit and a high-voltage battery connected to the main circuit, wherein the main circuit comprises a condenser, and the high-voltage battery is configured to pre-charge the condenser of the main circuit;
a low-voltage battery, of which an output voltage is lower than that of the high-voltage battery;
a collision detection part, configured to detect a collision of the vehicle;
a system control part, which operates by electric power supplied from the high-voltage circuit or the low-voltage battery and controls the main circuit, wherein the system control part operates by the electric power supplied from the high-voltage circuit when the collision is detected by the collision detection part;
a first system control power line, which connects the low-voltage battery to the system control part;
a second system control power line, which connects the high-voltage circuit to the system control part;
a switch, which is arranged on the second system control power line; and
a switch control part, configured to:
disconnect the high-voltage battery from the main circuit and close the switch to supply electric power from the high-voltage circuit to the system control part through the second system control power line when the collision is detected, and
open the switch to electrically disconnect the system control part from the high-voltage circuit when a pre-charge of the condenser of the main circuit is performed by supplying electric power of the high-voltage battery.

3. The electric power system of the vehicle according to claim 2, further comprising:
a voltage-reducing device which reduces a voltage of the electric power from the high-voltage circuit, wherein
one end of the second system control power line is connected to an output side of the voltage-reducing device, and the other end is connected to the first system control power line, on a side of the first system control power line that is closer to the low-voltage battery than a connecting point of the second system control power line, a first diode which permits a current from the low-voltage battery to the system control part is arranged, on the second system control power line, a second diode which permits a current from the voltage-reducing device to the system control part is arranged, and the voltage-reducing device reduces the voltage of the electric power from the high-voltage circuit to a voltage which is within an operation voltage scope of the system control part and is lower than an output voltage in a normal state of the low-voltage battery.

* * * * *